United States Patent
Yankovich et al.

(10) Patent No.: US 9,792,621 B2
(45) Date of Patent: Oct. 17, 2017

(54) DETERMINING USE OF A DISPLAY CHARACTERISTIC

(71) Applicant: PayPal, Inc., San Jose, CA (US)

(72) Inventors: Steve Yankovich, San Jose, CA (US); Han-Shen Yuan, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 27 days.

(21) Appl. No.: 14/228,089

(22) Filed: Mar. 27, 2014

(65) Prior Publication Data
US 2014/0214531 A1    Jul. 31, 2014

Related U.S. Application Data

(63) Continuation of application No. 12/637,649, filed on Dec. 14, 2009, now Pat. No. 8,725,583.

(51) Int. Cl.
G06Q 30/00 (2012.01)
G06Q 30/02 (2012.01)
G06Q 30/06 (2012.01)

(52) U.S. Cl.
CPC ......... G06Q 30/0251 (2013.01); G06Q 30/02 (2013.01); G06Q 30/0253 (2013.01); G06Q 30/0275 (2013.01); G06Q 30/0641 (2013.01)

(58) Field of Classification Search
CPC .................. G06Q 30/0601–30/0645; G06Q 30/0241–30/0277
USPC ............................ 705/26.1–27.2, 14.1–14.73
See application file for complete search history.

(56) References Cited

U.S. PATENT DOCUMENTS

| | | |
|---|---|---|
| 5,778,368 A | 7/1998 | Hogan et al. |
| 5,802,299 A | 9/1998 | Logan et al. |
| 5,948,054 A | 9/1999 | Nielsen |
| 6,029,141 A | 2/2000 | Bezos et al. |
| 6,167,426 A | 12/2000 | Payne et al. |

(Continued)

OTHER PUBLICATIONS

MyWeather selects engage ad management technology for delivery of personalized ads into MyWeather's online weather service. (May 7, 2002). Business Wire Retrieved from https://dialog.proquest.com/professional/professional/docview/678894986?accountid=142257.*

(Continued)

*Primary Examiner* — Resha Desai
(74) *Attorney, Agent, or Firm* — Maschoff Brennan

(57) ABSTRACT

A display characteristic determination machine receives a request to display seller-related content that references an item available for sale. The display characteristic determination machine identifies a display characteristic available from a web server, determines that the seller-related content is to be displayed using the display characteristic, and communicates to the web server that the seller-related content is to be displayed using the display characteristic and with primary content. The display characteristic determination machine may function as an allocation device to allocate use of the display characteristic. This functionality may be scaled, for example, to include determining use of multiple display characteristics, available from multiple web servers, by multiple instances of seller-related content requested for display by multiple sellers of multiple items. The display characteristic determination machine, therefore, may function as a "broker" for display characteristics available from multiple web servers.

18 Claims, 11 Drawing Sheets

(56) References Cited

U.S. PATENT DOCUMENTS

| | | | |
|---|---|---|---|
| 6,285,998 | B1 | 9/2001 | Black et al. |
| 6,307,573 | B1 | 10/2001 | Barros |
| 6,332,150 | B1 | 12/2001 | Khan et al. |
| 6,493,733 | B1 | 12/2002 | Pollack et al. |
| 6,615,238 | B1 | 9/2003 | Melet et al. |
| 8,725,583 | B2 | 5/2014 | Yankovich et al. |
| 2002/0052806 | A1* | 5/2002 | Hodson ............... G06Q 30/06 705/26.8 |
| 2003/0055729 | A1* | 3/2003 | Bezos ................ G06Q 30/02 705/14.31 |
| 2003/0204447 | A1* | 10/2003 | Dalzell ............ G06Q 30/0613 235/375 |
| 2008/0208761 | A1 | 8/2008 | Autry et al. |
| 2008/0209327 | A1* | 8/2008 | Drucker ................ G06F 9/542 715/733 |
| 2008/0255962 | A1 | 10/2008 | Chang |
| 2009/0265257 | A1* | 10/2009 | Klinger ................ G06Q 30/02 705/26.1 |
| 2011/0047026 | A1 | 2/2011 | Biggs et al. |
| 2011/0119139 | A1* | 5/2011 | Dean ................ G06F 17/30864 705/14.73 |
| 2011/0145062 | A1 | 6/2011 | Yankovich et al. |

OTHER PUBLICATIONS

"U.S. Appl. No. 12/637,649, Advisory Action dated Nov. 20, 2012", 3 pgs.

"U.S. Appl. No. 12/637,649, Final Office Action dated Sep. 26, 2012", 15 pgs.

"U.S. Appl. No. 12/637,649, Non Final Office Action dated Mar. 30, 2012", 14 pgs.

"U.S. Appl. No. 12/637,649, Non Final Office Action dated Jun. 18, 2013", 17 pgs.

"U.S. Appl. No. 12/637,649, Notice of Allowance dated Dec. 27, 2012", 11 pgs.

"U.S. Appl. No. 12/637,649, Response filed Jun. 29, 2012 to Non Final Office Action dated Mar. 30, 2013", 11 pgs.

"U.S. Appl. No. 12/637,649, Response filed Sep. 18, 2013 to Non Final Office Action dated Jun. 18, 2013", 15 pgs.

"U.S. Appl. No. 12/637,649, Response filed Nov. 9, 2012 to Final Office Action dated Sep. 26, 2012", 13 pgs.

"eBay To Go", [Online]. Retrieved from the Internet: <URL: http://togo.ebay.com/done/>, (Aug. 11, 2009), 1 pg.

"eBay To Go (2)", [Online]. Retrieved from the Internet: <URL: http://togo.ebay.com/done/>, (Aug. 11, 2009), 1 pg.

"Google AdSense—Where should I place Google adds on my page", [Online]. Retrieved from the Internet: <URL: https://www.google.com/adsense/support/bin/answer.py?answer=17954>, (Dec. 4, 2009), 1 pg.

"Google Adwords—Advertise your business on Google", Costs and Payment, [Online]. Retrieved from the Internet: <URL: https://www.google.com/accounts/ServiceLogin?service=adwords&cd=null&hl=en-US<mpl=adwords>, (Dec. 4, 2009), 1 pg.

"Google Adwords—Advertise your business on Google", How it Works, [Online]. Retrieved from the Internet: <URL: https://www.google.com/accounts/ServiceLogin?service=adwords&cd=null&hl=en-US<mpl=adwords>, (Dec. 4, 2009), 1 pg.

"Promoting your item with listing upgrades", [Online]. Retrieved from the Internet: <http://pages.ebay.com/help/sell/promoting_ov.html>, (Dec. 4, 2009), 2 pgs.

Li, N, "Toward e-commerce website evaluation and use: A balanced view", Order No. 3347263, Syracuse University, (2008), 32 pgs.

Naumann, David, "1-800-Flowers.com Opens Millions of Stores Overnight", Alvenda Press Release, 2 pgs.

Naumann, David, "1-800-Flowers.com Opens Millions of Stores Overnight", Alvenda Case Study, (2009), 4 pgs.

* cited by examiner

DETERMINING USE OF A DISPLAY CHARACTERISTIC

TECHNICAL FIELD

The subject matter disclosed herein generally relates to data processing. Specifically, the present disclosure addresses methods and systems to determine use of a display characteristic.

BACKGROUND

A web server typically provides content to be displayed by a web client. In many cases, the web server transmits primary content to the web client for display (e.g., in a web browser application). For example, a media publisher's web server may transmit a webpage containing a news article to the web client. Moreover, a web server may provide supplemental content to be displayed with the primary content. As an example, the web page transmitted by the media publisher's web server may contain an advertisement to be displayed with the news article. Multiple instances of supplemental content (e.g., multiple advertisements) may be displayed with the primary content (e.g., the news article).

In some cases, the advertisement is a hyperlink to another web page (e.g., served by another web server) that contains information related to the advertisement, and a user of the web client may click on the advertisement to abandon viewing of the primary content (e.g., the news article) and initiate viewing of the advertisement-related web page. In common parlance, this may be referred to as "surfing away from" the primary content. In certain situations, the advertisement-related webpage functions as a storefront that allows a user to initiate a purchase transaction of an item shown or described in the advertisement.

BRIEF DESCRIPTION OF THE DRAWINGS

Some embodiments are illustrated by way of example and not limitation in the figures of the accompanying drawings in which.

DETAILED DESCRIPTION

Figure 1:
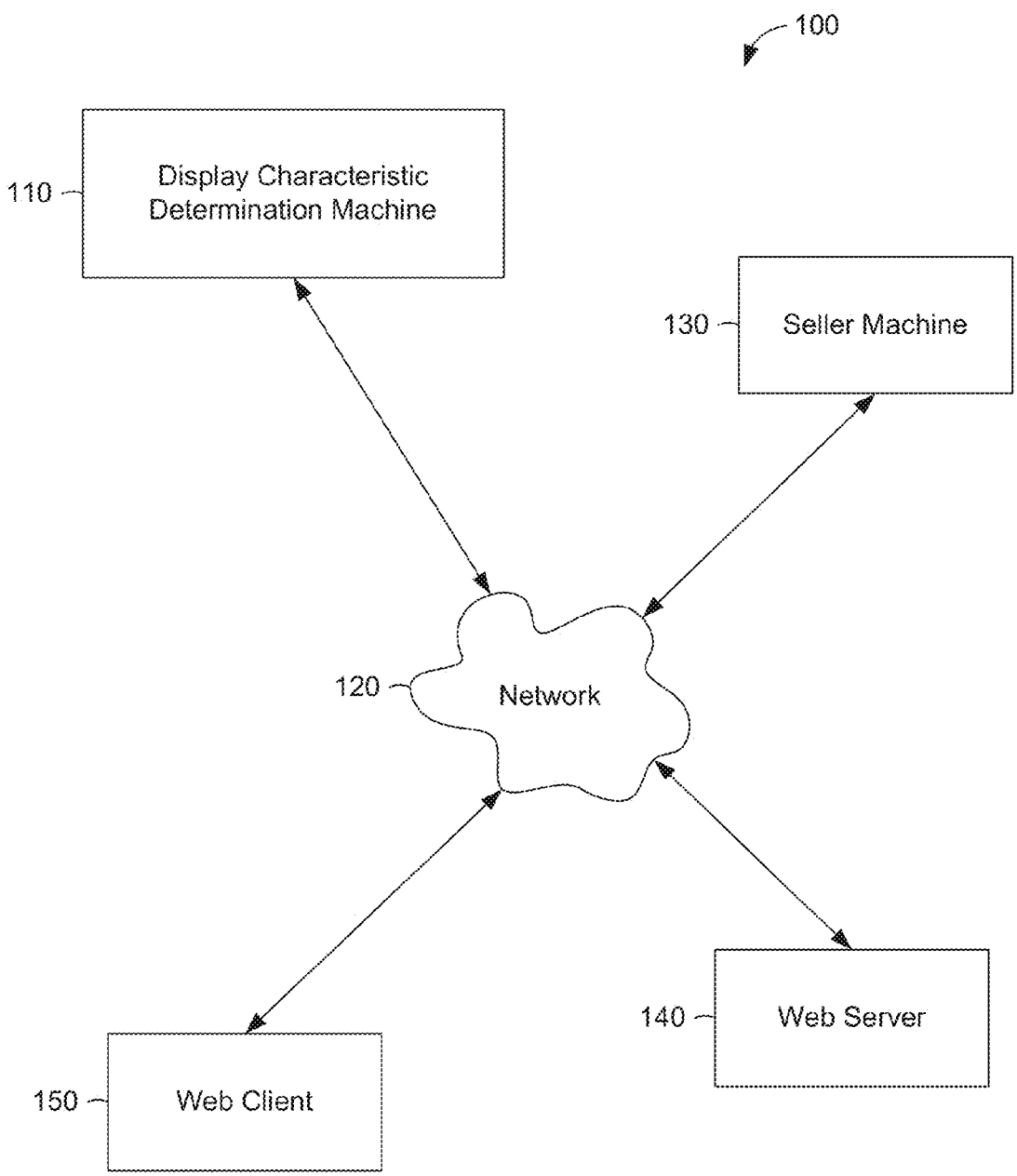
FIG. 1 is a network diagram illustrating a system with a display characteristic determination machine, according an example embodiment.

Example methods and systems are directed to determining use of a display characteristic. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

According to an example embodiment, a display characteristic determination machine determines that seller-related content is to be displayed using a display characteristic with primary content available from a web server. Specifically, the display characteristic determination machine receives a seller-generated request to display the seller-related content. The seller-related content references an item available for sale. The display characteristic determination machine identifies a display characteristic that is available from a web server, determines that the seller-related content is to be displayed using the display characteristic, and communicates to the web server that the seller-related content is to be displayed using the display characteristic and with primary content.

In determining that a particular instance of seller-related content is to be displayed using the display characteristic, the display characteristic determination machine may function as an allocation device that allocates the use of the display characteristic by determining that the particular instance of seller-related content is to use the display characteristic. This functionality may be scaled, for example, to include determining use of multiple display characteristics, available from multiple web servers, by multiple instances of seller-related content requested for display by multiple sellers of multiple items. The display characteristic determination machine, therefore, may function as a "broker" for display characteristics.

A display characteristic, as used herein, is a characteristic or attribute applicable to the displaying of seller-related content. For example, a display characteristic may be a visual differentiator that distinguishes an instance of seller-related content from other instances of seller-related content appearing on the same webpage. Examples of visual differentiators include, but are not limited to, a size (e.g., 120×600 pixels, 468×60 pixels, or 180×150 pixels), a time (e.g., a single date, or a time period), a typeface e.g., boldface, italics, or underlined), and a layout position relative to the primary content (e.g., adjacent to the upper left corner of the primary content, or above the primary content).

Sellers of items may recognize various display characteristics as likely to facilitate increased attention being directed to a seller-related content from users. Accordingly, in some example embodiments, the display characteristic determination machine may receive a bid for a display characteristic, as well as price information for the display characteristic, and determine that the seller-related content is to be displayed using the display characteristic based on a comparison of the bid to the price information. This may have the effect of facilitating an auction process for the display characteristic.

Moreover, in various example embodiments, the display characteristic determination machine receives a display characteristic profile, a seller preference profile, a product profile, or any suitable combination thereof. The display characteristic profile includes information regarding the display characteristic; the seller preference profile includes information regarding a seller's preferences; and the product profile includes information regarding the item available for sale. Using such information, the display characteristic determination machine may perform its functions as a "broker" of display characteristics in a manner likely to satisfy goals of the seller.

FIG. 1 illustrates a system 100 with a display characteristic determination machine 110, according to an example embodiment. The system 100 includes the display characteristic determination machine 110, a seller machine 130, a web server 140, and web client 150, all connected to a network 120 and configured to communicate with each other via the network 120. According to some example embodiments, the display characteristic determination machine 110 is implemented using a computer that has been programmed by software to perform a method of determining use of a display characteristic, as described below with respect to FIG. 7.

The seller machine 130 is associated with a seller of an item available for sale. The seller machine 130 may function as a source of information relating to the item available for sale (e.g., a seller-generated request, a seller-generated bid, a seller preference profile, or a product profile).

The web server 140 may function as a source of content (e.g., primary content, or supplemental content). Specifically, the web server 140 is to transmit primary content via the network 120 (e.g., to the web client 150). For example, the web server 140 may be a server of web pages containing content. The web server 140 may be implemented as a web server machine (e.g., a computer operated as a web server).

The web client 150 is associated with a user, who may be a potential buyer of the item available for sale. The web client 150 may be implemented as a web client machine (e.g., a computer operated as a web client).

The network 120 may be any network that enables communication between or among machines (e.g., display characteristic determination machine 110, or seller machine 130). Accordingly, the network 120 may be a wired network, a wireless network, or any suitable combination thereof. The network 120 may include one or more portions that constitute a private network, a public network (e.g., the Internet), or any suitable combination thereof.

Figure 2:
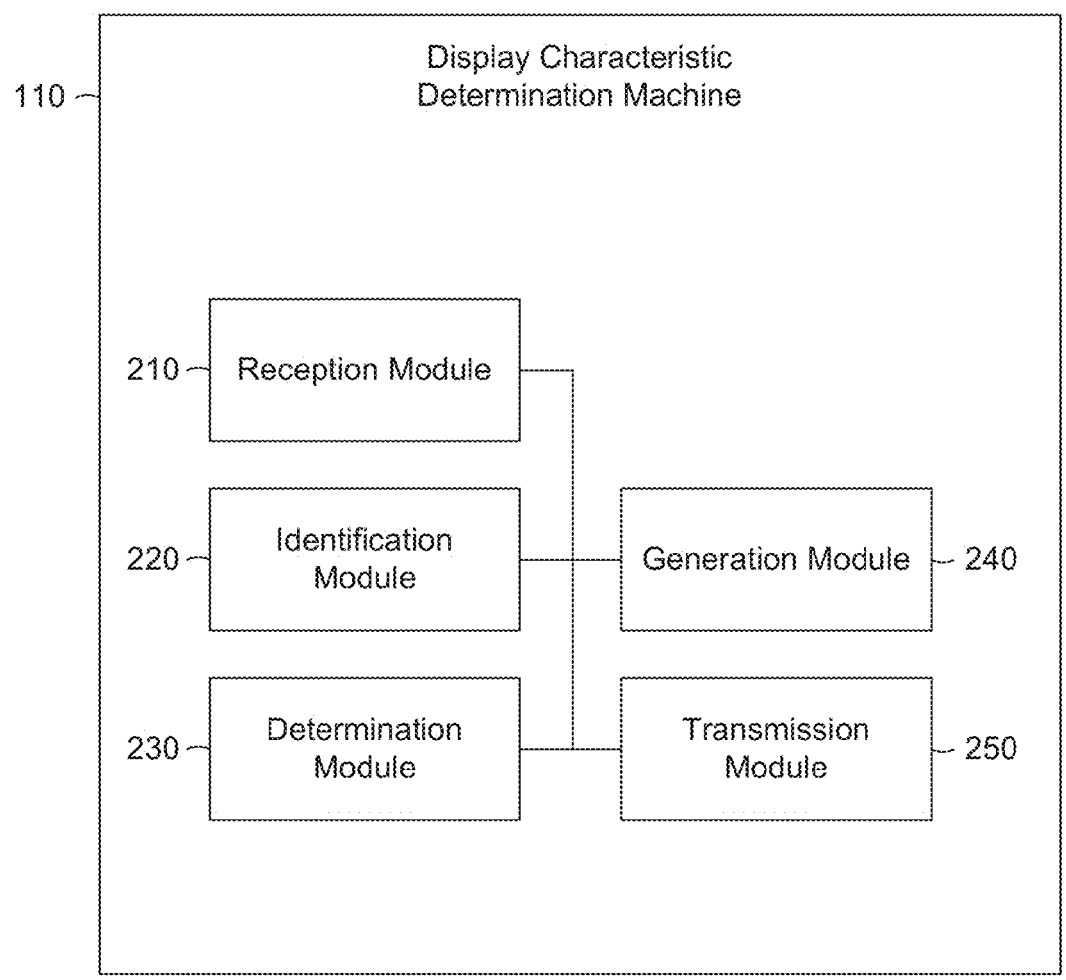
FIG. 2 is a block diagram illustrating the display characteristic determination machine, according to an example embodiment.

FIG. 2 illustrates components of the display characteristic determination machine 110, according to an example embodiment. The display characteristic determination machine 110 includes a reception module 210, an identification module 220, a determination module 230, a generation module 240, and a transmission module 250. Any of these modules may be implemented using hardware, as described below with respect to FIG. 11. Moreover, any two or more of these modules may be combined into a single module, and the functions described herein for a single module may be subdivided among multiple modules.

The reception module 210 receives a seller-generated request to display seller-related content with primary content available from the web server 140. The seller-related content may reference an item available for sale (e.g., by a seller associated with the seller machine 130), and the seller-generator request may include an identifier of the web server 140 (e.g., a Uniform Resource Locator (URL)), an identifier of the display characteristic (e.g., an alphanumeric string of characters), or any suitable combination thereof. The reception module 210, in various example embodiments, receives the seller-generated request as a submission made by the seller in interacting with a webpage displayed by the seller machine 130. According to some example embodiments, the reception module 210 receives the seller-generated request in a communication transmitted by the seller machine 130 as a result of an instruction or an authorization generated by the seller. The seller-generated request may request that the seller-related content be generated for display.

The identification module 220 identifies a display characteristic applicable to the seller-related content. The display characteristic is available from the web server 140. For example, the identification module 220 may identify an available layout position as the display characteristic. As used herein, a layout position is graphical position available for supplemental content to be displayed with primary content. An available layout position may be described in relation to the primary content (e.g., left, right, above, below, etc.).

The determination module 230 determines that the seller-related content is to be displayed using the display characteristic. As an example, the seller-related content may be an advertisement for a pair of shoes available for sale; the display characteristic may be identified as a "skyscraper" advertisement size (e.g., 120 pixels wide and 600 pixels tall); and the determination module 230 may determine that the shoe advertisement is to be displayed using the "skyscraper" advertisement size.

The transmission module 250 communicates to the web server 140 that the seller-related content is to be displayed using the display characteristic and with the primary content. This may have the effect of notifying the web server 140 that the display characteristic has been allocated to a particular instance of seller-related content. Continuing the above example, the primary content may be a news article, and the transmission module 250 may communicate to the web server 140 that the "skyscraper" advertisement size has been allocated to the shoe advertisement, such that the shoe advertisement is to be displayed using the "skyscraper" advertisement size and with the news article.

The generation module 240 generates at least some of the seller-related content. This generation of seller-related content may be responsive to the seller-generated request received by the reception module 210, or alternatively, responsive to a separate request (e.g., from the seller machine 130).

Figure 3:
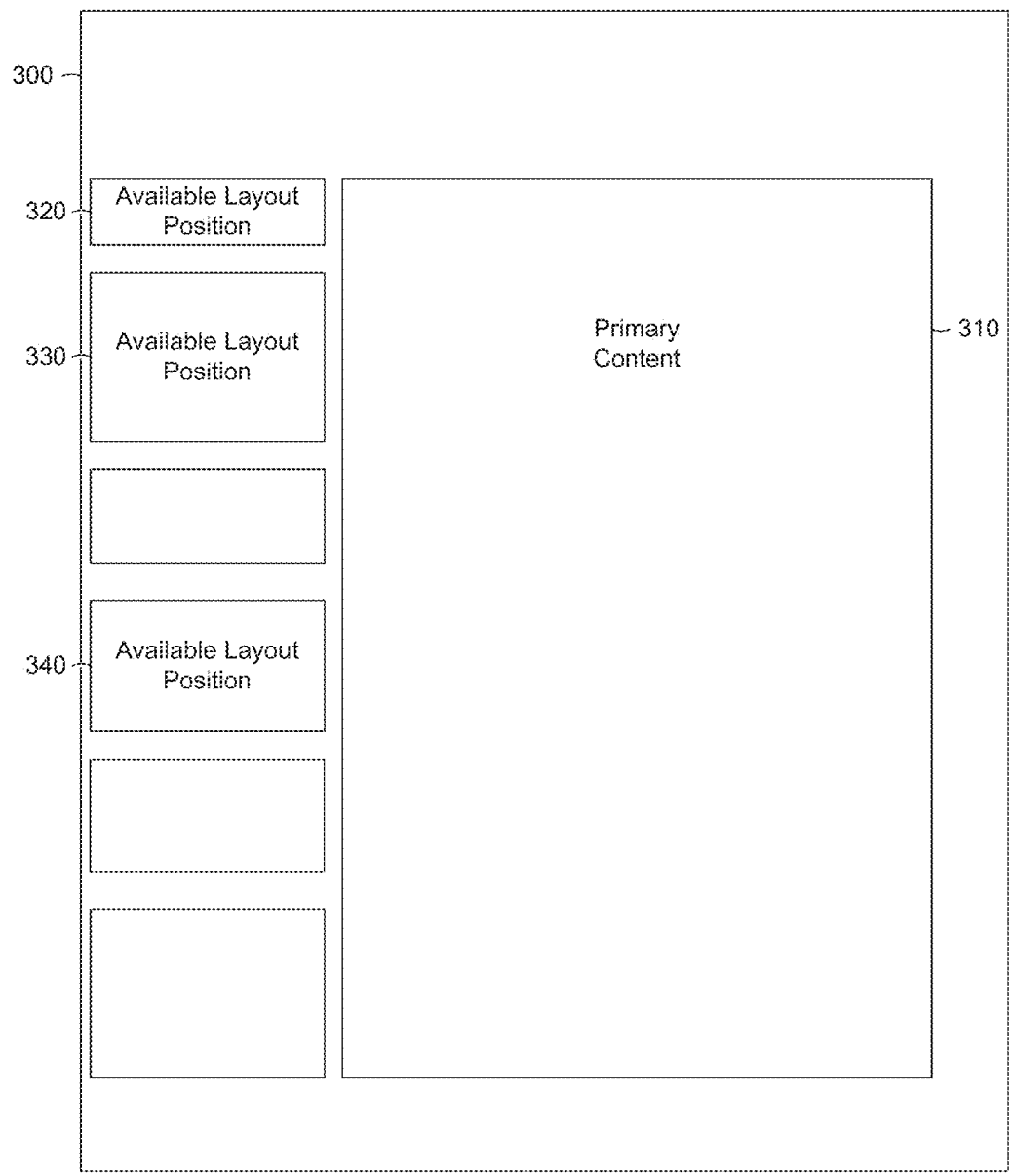
FIG. 3 is a diagram illustrating a webpage with primary content and available layout positions for supplemental content, according to an example embodiment.

FIG. 3 illustrates a webpage 300 with primary content 310 and available layout positions 320-340 for supplemental content, according to an example embodiment. The webpage 300 may be generated, assembled, transmitted, or any suitable combination thereof, by the web server 140. As shown, the webpage 300 includes the primary content 310 and multiple available layout positions 320-340. For example, the primary content 310 may be a news article, and available layout positions 320-340 may be graphical positions available for advertisements to be displayed with the news article.

Figure 4:
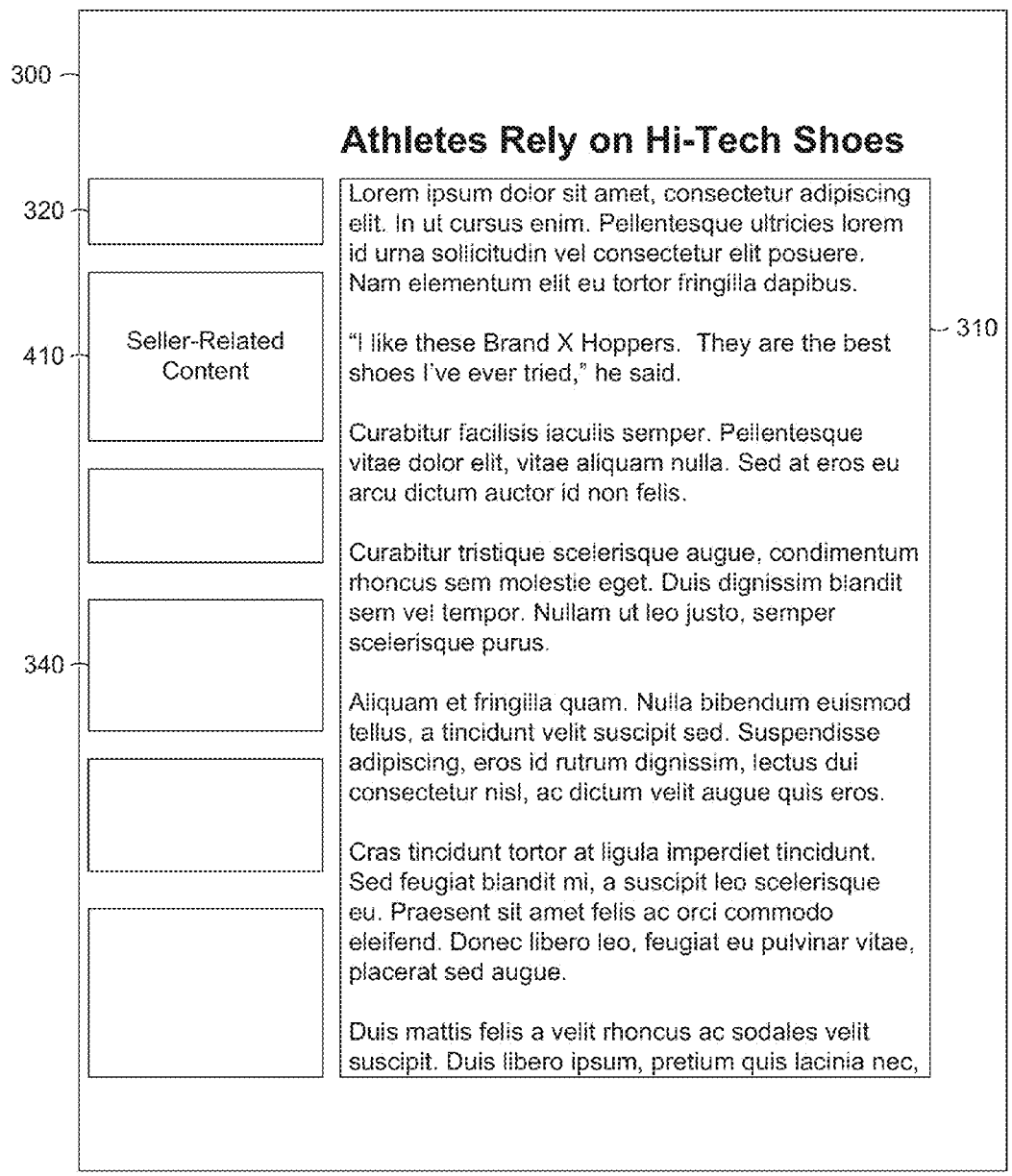
FIG. 4 is a diagram illustrating the webpage with the primary content and seller-related content, according to an example embodiment.

FIG. 4 illustrates the webpage 300 with the primary content 310 and seller-related content 410 occupying a layout position previously shown as an available layout position 330, according to an example embodiment. In the example embodiment shown, the primary content 310 is a news article titled "Athletes Rely on Hi-Tech Shoes." The seller-related content 410 may be an advertisement that is related to the news article (e.g., an advertisement for shoes mentioned in the news article). In other example embodiments, the seller-related content 410 is a storefront (e.g., implemented using a web-based "widget") that is operable by a user of the web client 150 to initiate a purchase transaction. The purchase transaction may be of an item available for sale (e.g., shoes mentioned in the news article). The seller-related content 410 may enable interaction with the user without "surfing away" from the primary content 310. The seller-related content 410 may also include a hyperlink to another webpage (e.g., served by another web server). Available layout positions 320 and 340 are shown in FIG. 4 in the same positions as shown in FIG. 3.

Figure 5:
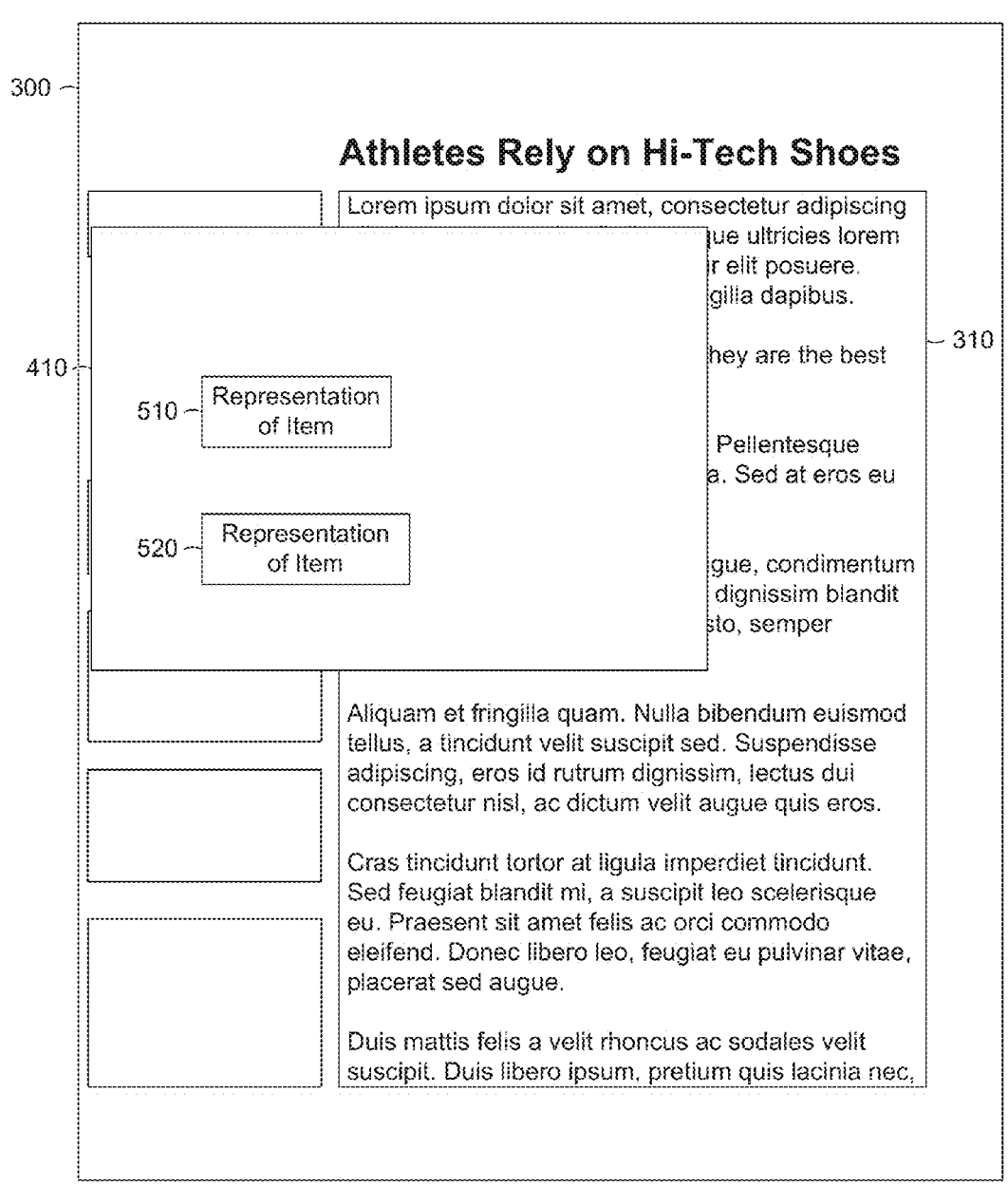
FIG. 5 is a block diagram illustrating the webpage with the seller-related content showing representations of items, according to an example embodiment.

FIG. 5 illustrates the webpage 300 with the seller-related content 410 showing representations 510-520 of items, according to an example embodiment. The primary content 310 (e.g., the news article) continues to appear in the webpage 300, although the primary content 310 is partially obscured by the seller-related content 410. The seller-related content 410 displays representations 510 and 520 of items available for sale. The representations 510 and 520 are displayed to the user without "surfing away" from the primary content 310. As noted above, the seller-related content 410 may be a storefront operable to initiate a purchase transaction (e.g., of one or more items are presented by representations 510 and 520).

Figure 6:
FIG. 6 is a diagram illustrating the seller-related content and the representations of the items, according to an example embodiment.

FIG. 6 illustrates the seller-related content 410 and the representations 510-520 of the items, according to an example embodiment. The seller-related content 410 may be a storefront operable to initiate a purchase, and the seller-related content 410 may be generated by the generation module 240 of the display characteristic determination machine 110.

As shown in FIG. 6, a representation 510 of an item is labeled as "Brand X HOPPER" and represents a pair of shoes available for sale and mentioned in the primary content 310. Another representation 520 of another item is labeled as "Brand Y AVIATOR" and represents another pair of shoes available for sale and not mentioned in the primary content 310. As discussed in detail below, one seller may request that a representation 510 be included in the seller-related content 410, while another seller may request that another representation 520 be included in the seller-related content 410 as well. A seller-generated request may include merchandising data that associates the seller's item with another seller, another item, or any suitable combination thereof.

Figure 7:
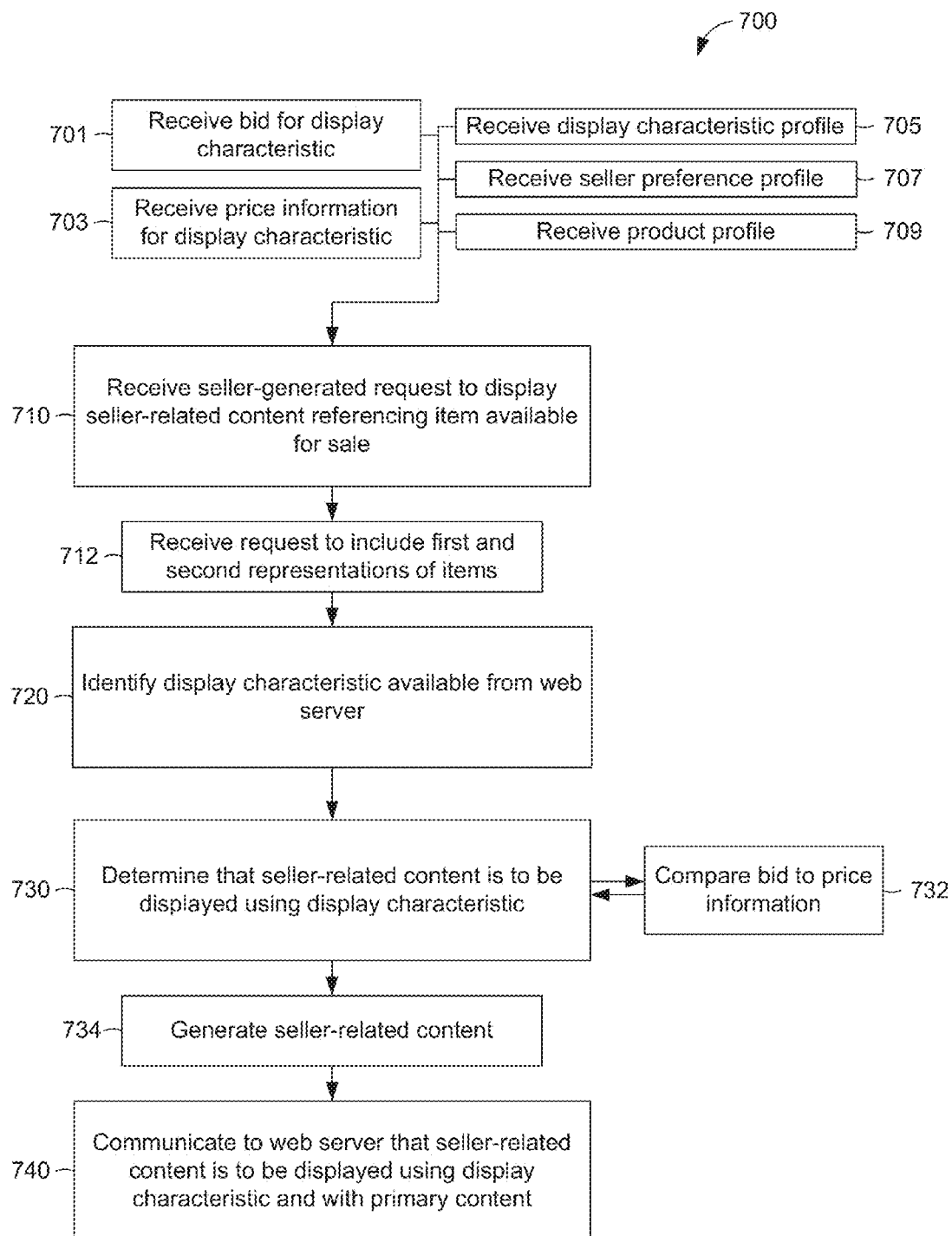
FIG. 7 is a flow chart illustrating a method of determining use of a display characteristic, according to an example embodiment.

FIG. 7 illustrates a method 700 of determining use of a display characteristic, according to an example embodiment. The method 700 includes operations 701-740, which are shown in a particular sequence, but are not limited to the sequence shown.

Operation 710 may be performed by the reception module 210 of the display characteristic determination machine 110. Operation 710 involves receiving a seller-generated request to display seller-related content 410 with primary content available from the web server 140. As noted above, the seller-related content 410 references an item available for sale (e.g., the item represented by representation 510). The seller-generated request, in some example embodiments, includes an identifier of the web server 140 (e.g., a URL).

Operation 720 may be performed by the identification module 220 of the display characteristic determination machine 110. Operation 720 involves identifying a display characteristic applicable to the seller-related content 410. As noted above, the display characteristic is available from the web server 140. The seller-generated request may include an identifier of the display characteristic (e.g., an alphanumeric string of characters). The identifying performed in operation 720 may be based on the identifier of the web server 140 (e.g., the URL), the identifier of the display characteristic, or any suitable combination thereof.

Operation 730 may be performed by the determination module 230 of the display characteristic determination machine 110. Operation 730 involves determining that the seller-related content 410 is to be displayed using the display characteristic. This may have the effect of allocating the display characteristic to the seller-related content 410. The determining performed in operation 730 may be based on additional information received by the reception module 210, as discussed below with respect to operations 701-709.

Operation 734 may be performed by the generation module 240 of the display characteristic determination machine 110. Operation 734 involves generating at least some of the seller-related content 410. Operation 734 may include generating at least some of the seller-related content 410 to include a storefront. The storefront may be operable by a user (e.g., a buyer using web client 150) to initiate a purchase transaction of the item available for sale (e.g., the item represented by representation 510). In various example embodiments, operation 734 includes generating at least some of the seller-related content 410 to include an advertisement of the item available for sale.

Operation 740 may be performed by the transmission module 250 of the display characteristic determination machine 110. Operation 740 involves communicating to the web server 140 that the seller-related content 410 is to be displayed using the display characteristic and with the primary content 310. This may have the effect of communicating to the web server 140 that the display characteristic identified in operation 720 has been allocated to the seller-related content 410. Operation 740 may include transmitting a similar notification to the seller machine 130 so as to communicate to the seller that the seller-related content 410 is to be displayed using the display characteristic and with the primary content 310. This notification may include a final bid (e.g., the bid received in operation 701, or an increased bid) and may have the effect of placing the seller on notice to pay a price for use of the display characteristic. In performing operation 740, the transmission module 250 may transmit a message via the network 120 (e.g., an email message, a text message, an instant message, a voicemail, a data file, etc.) to the web server 140, the seller machine 130, or any suitable combination thereof.

As noted above, the display characteristic may be a visual differentiator. Examples of visual differentiators include, but are not limited to, a size, a time, a typeface, and a layout position relative to the primary content, as discussed above.

Any one or more of operations 701-709 may be performed by the reception module 210 of the display characteristic determination machine 110, according to some example embodiments. Operation 701 involves receiving a bid for the display characteristic. The bid may be a seller-generated bid that identifies the display characteristic, and the bid may contain a proposed price to be paid for use of the display characteristic. Operation 703 involves receiving price information of the display characteristic from the web server 140. The price information may identify a threshold price (e.g., a minimum price) to be paid for use of the display characteristic. According to some example embodiments, the determination module 230 accesses the bid and the price information, and operation 730 includes operation 732, in determining that the seller-related content 410 is to be displayed using the display characteristic. Operation 732 involves comparing the bid to the price information and may be performed by the determination module 230. This may have the effect of implementing an auction process to allocate use of the display characteristic to the seller-related content 410.

Operation 705 involves receiving a display characteristic profile, discussed below with respect to FIG. 8. Operation 707 involves receiving a seller preference profile, discussed below with respect to FIG. 9, and operation 709 involves receiving a product profile, discussed below with respect to FIG. 10. According to some example embodiments, the determination module 230 accesses one or more of these profiles, and the determining performed in operation 730 is based on the one or more of these profiles.

According to some example embodiments, the item available for sale is a first item available from a first seller, and operation 734 includes generating at least some of the seller-related content 410 to include a first representation (e.g., representation 510) of a first item (e.g., a pair of "Brand X HOPPER" shoes) and a second representation (e.g., representation 520) of a second item (e.g., a pair of "Brand Y AVIATOR" shoes). The first representation may represent the first item as available for sale from a first seller (e.g., a shoe store) and the second representation may represent the second item as available for sale from a second seller (e.g., a sporting goods merchant). Operation 734 may be performed by the generation module 240.

In certain example embodiments, the seller-generated request received in operation 710 is a first request, and operation 712 involves receiving a second request that the seller-related content 410 include the first representation (e.g., representation 510) and the second representation (e.g., representation 520). The second request may include merchandising data that associates the first item with the second item, with the second seller, or any suitable combination thereof. Operation 712 may be performed by the reception module 210. This may have the effect of allowing the first seller (e.g., the shoe store) to cause the first item (e.g., the "Brand X HOPPER" shoes) to be presented with the second item (e.g., the "Brand Y AVIATOR" shoes) in the seller-related content 410. For example, the first item may be presented as an alternative to the second item, a recommendation for users interested in the second item, a recommendation for users interested in the primary content 310 (e.g., the news article), or any suitable combination thereof. In common parlance, this may be referred to as "drafting," in which merchandising of the first item may benefit from its visual association with merchandising of the second item.

Figure 8:
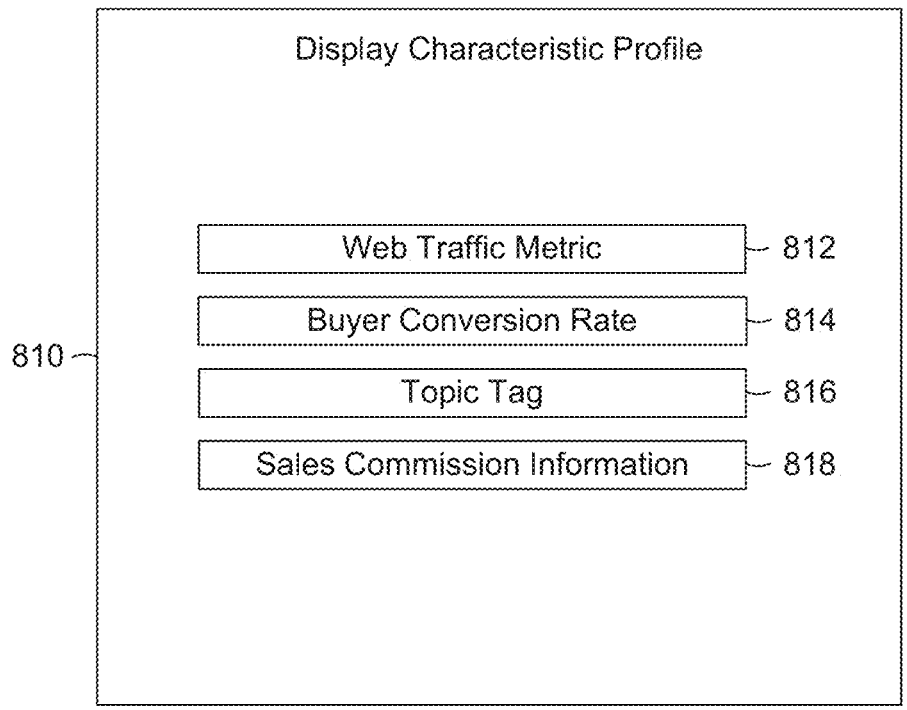
FIG. 8 is a block diagram illustrating a data structure embodying a display characteristic profile, according to an example embodiment.

FIG. 8 illustrates a data structure embodying a display characteristic profile 810, according to an example embodiment. The display characteristic profile 810 may be received by the reception module 210 in operation 705. The display characteristic profile 810 may include one or more parameters that describe the display characteristic available from the web server 140. These one or more parameters may be influential in determining a value of the display characteristic, and accordingly used in by the determination module 230 operation 730 to determine that the seller-related content 410 is to be displayed using the display characteristic. The display characteristic profile 810 includes a web traffic metric 812, a buyer conversion rate 814, a topic tag 816, and sales commission information 818.

The web traffic metric 812 may represent a level of web-based traffic (e.g., page views, page loads, clicks, etc.) corresponding to the display characteristic, as made available (e.g., offered) by the web server 140. In some example embodiments, a high level of web-based traffic is correlated with a high price expected to be paid for use of the display characteristic.

The buyer conversion rate 814 may represent a proportion of users associated with the display characteristic who subsequently initiated a purchase transaction. For example, the display characteristic may be a layout position (e.g., available layout position 330), and the buyer conversion rate 814 may represent a percentage of users who clicked on content displayed in the layout position and subsequently initiated a purchase transaction for an item corresponding to that content. According to certain example embodiments, a high proportion of users who initiate a purchase transaction (e.g., a proportion exceeding a threshold value) is correlated with a high price expected to be paid for use of the display characteristic.

The topic tag 816 may represent one or more keywords related to the primary content 310. The one or more keywords may facilitate classifying the display characteristic, indexing the display characteristic, searching for the display characteristic, matching the seller-related content 410 to the display characteristic, or any suitable combination thereof.

The sales commission information 818 may represent a variable cost of using the display characteristic. For example, the price information received in operation 703 may constitute a fixed or initial cost to use the display characteristic (e.g., $100), while the sales commission information 818 may specify that an additional percentage of sales (e.g., 1.5%) that result from use of the display characteristic is to be paid for use of the display characteristic.

In various example embodiments, some or all of the display characteristic profile 810 is combined with the price information received in operation 703.

Figure 9:
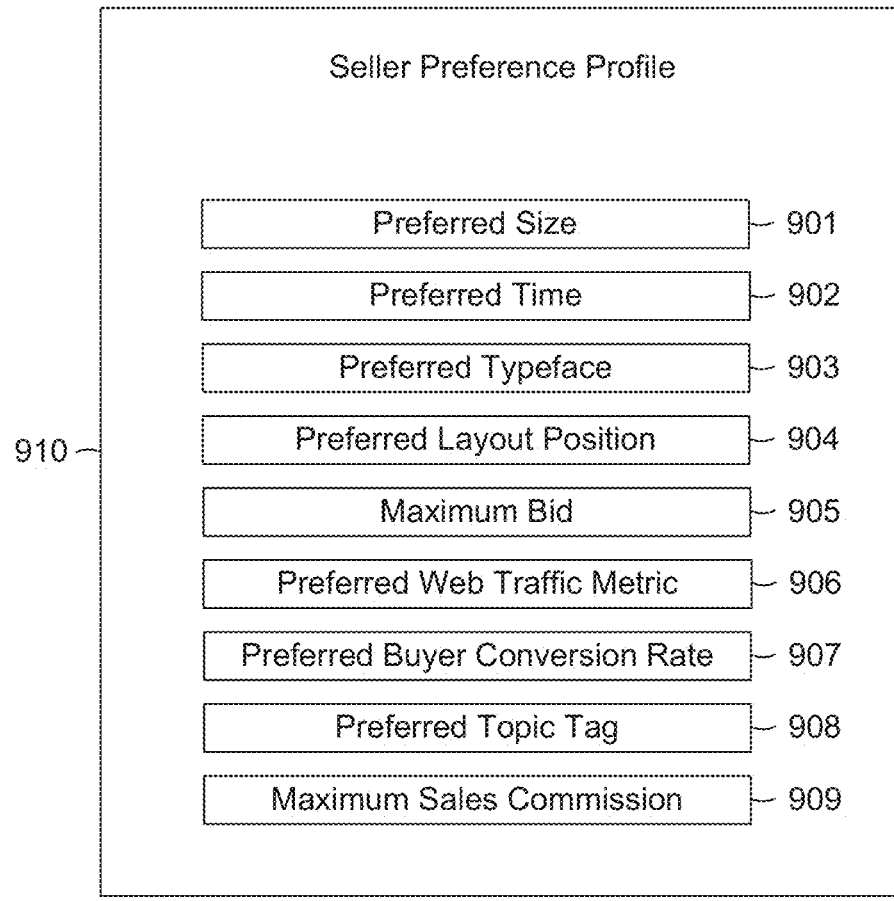
FIG. 9 is a block diagram illustrating a data structure embodying a seller preference profile, according to an example embodiment.

FIG. 9 illustrates a data structure embodying a seller preference profile 910, according to an example embodiment. The seller preference profile 910 may be received by the reception module 210 in operation 707. The seller preference profile may include one or more parameters. These one or more parameters may be specified by the seller associated with the seller machine 130. The determination module 230 may use these parameters in operation 730 to determine that the seller-related content 410 is to be displayed using the display characteristic. The seller preference profile 910 includes a preferred size 901, a preferred time 902, a preferred typeface 903, a preferred layout position 904, a maximum bid 905, a preferred web traffic metric 906, a preferred buyer conversion rate 907, a preferred topic tag 908, and a maximum sales commission 909.

The preferred size 901 may specify a size (e.g., in pixels) for the seller-related content 410. The preferred time 902 may specify a single time (e.g., a date) or a time period (e.g., a range of dates, or duration of time) for the seller-related content 410 to be displayed. The preferred typeface 903 may specify a typography-related attribute (e.g., boldface, italics, or underlining). The preferred layout position 904 may specify a graphical position with respect to primary content (e.g., primary content 310) to be displayed with the seller-related content 410.

The maximum bid 905 may represent a seller-specified limit on the price to be paid for use of the display characteristic. For example, the determination module 230 of the display characteristic determination machine 110 may provide an automated service that incrementally increases the seller-generated bid received in operation 701, and the seller may submit the maximum bid 905 to restrict such automatic increases in the bid.

The preferred web traffic metric 906, the preferred buyer conversion rate 907, the preferred topic tag 908, and the maximum sales commission 909 respectively correspond to the web traffic metric 812, the buyer conversion rate 814, the topic tag 816, and the sales commission information 818 of the display characteristic profile 810. The preferred web traffic metric 906 may specify a value of the web traffic metric 812 desired by the seller. Similarly, the preferred buyer conversion rate 907 may specify a value of the buyer conversion rate 814 desired by the seller. Furthermore, the preferred topic tag 908 may specify one or more keywords to be matched with the one or more keywords of the topic tag 816. The maximum sales commission 909 may represent a seller-specified limit on variable costs (e.g., sales commission percentage) to be paid for use of the display characteristic to display the seller-related content 410.

Figure 10:
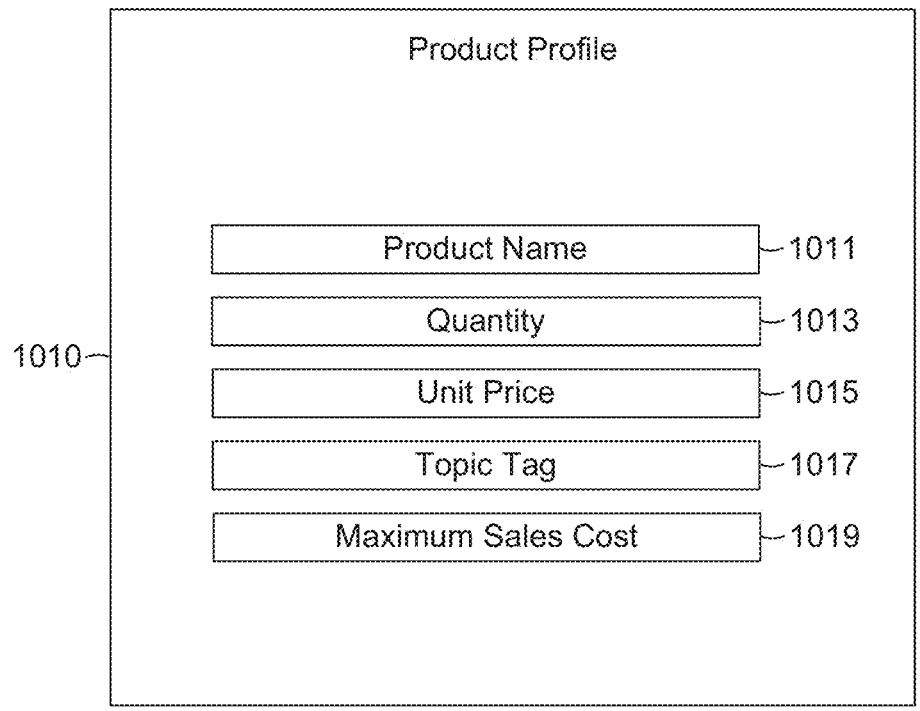
FIG. 10 is a block diagram illustrating a data structure embodying a product profile, according to an example embodiment.

FIG. 10 illustrates a data structure embodying a product profile 1010, according to an example embodiment. The product profile 1010 may be received by the reception module 210 in operation 709. The product profile 1010 may include one or more parameters. These one or more parameters may be specified by the seller of the item available for sale (e.g., a seller associated with a seller machine 130). The determination module 230 may use these parameters in operation 730 to determine that the seller-related content 410 is to be displayed using the display characteristic. The product profile 1010 includes a product name 1011, a quantity 1013, a unit price 1015, a topic to 1017, and a maximum sales cost 1019.

The product name 1011 may specify a name of the item available for sale (e.g., "Brand X HOPPERS shoes") referenced in the seller-related content 410. In some example embodiments, the determination module 230 performs operation 730, at least in part, by matching the product name 1011 to one or more words appearing in the primary content 310.

The quantity 1013 may represent a number of such items available for sale, and the unit price 1015 may represent a price set by the seller for each of such items. In certain example embodiments, the determination module 230 performs operation 730, at least in part, by assigning special weight or priority to large inventories of items, high-priced items, or any suitable combination thereof.

The topic tag 1017 corresponds to the topic tag 816 of the display characteristic profile 810. In various example embodiments, the topic tag 1017 specifies one or more keywords to be matched with the one or more keywords of the topic tag 816 of the display characteristic profile 810.

The maximum sales cost 1019 may represent a seller-specified limit on variable costs (e.g., sales commission percentage) to be paid for use of the display characteristic to display the seller-related content 410. According to various example embodiments, the maximum sales commission 909 of the seller preference profile 910 may be representative of a limit set by the seller for all items available from the seller, while the maximum sales cost 1019 of the product profile 1010 may be representative of a limit set by the seller specifically for the item available for sale (e.g., specifically for "Brand X HOPPERS" shoes).

Example embodiments described herein may facilitate an automated service (e.g., provided by the display characteristic determination machine 110) that identifies one or more display characteristics likely to be most satisfactory to the seller of the item available for sale. The service may select and allocate a suitable display characteristic from multiple display characteristics that are available from one or more web servers (e.g., web server 140). In some example embodiments, the service identifies and recommends display characteristics for manual selection by the seller (e.g., using the seller machine 130).

As noted above, the determination that the seller-related content 410 is to be displayed using the identified display characteristic may be based on additional information received (e.g., by reception module 210 of the display characteristic determination machine 110). Moreover, the generation module 240 may generate at least some of the seller-related content 410 (e.g., in operation 734) by setting a price for the item available for sale (e.g., a pair of shoes). Accordingly, the automated service (e.g., provided by the display characteristic determination machine 110) may identify the display characteristic and generate the seller-related content 410 in a manner likely to optimize sales. For example, the identified display characteristic may enable a suitably large number of users to view a representation of the item (e.g., representation 510) and purchase the item at a price calculated to maximize profit for the seller.

Moreover, the automated service may optimize sales or rentals of display characteristics available from multiple web servers (e.g., web server 140). As an example, the display characteristic determination machine 110 may function as a "broker" of display characteristics and, in determining that the seller-related content 410 is to use the identified display characteristic, identify the corresponding seller as the most profitable user (e.g., purchaser or renter) of the display characteristic.

Figure 11:
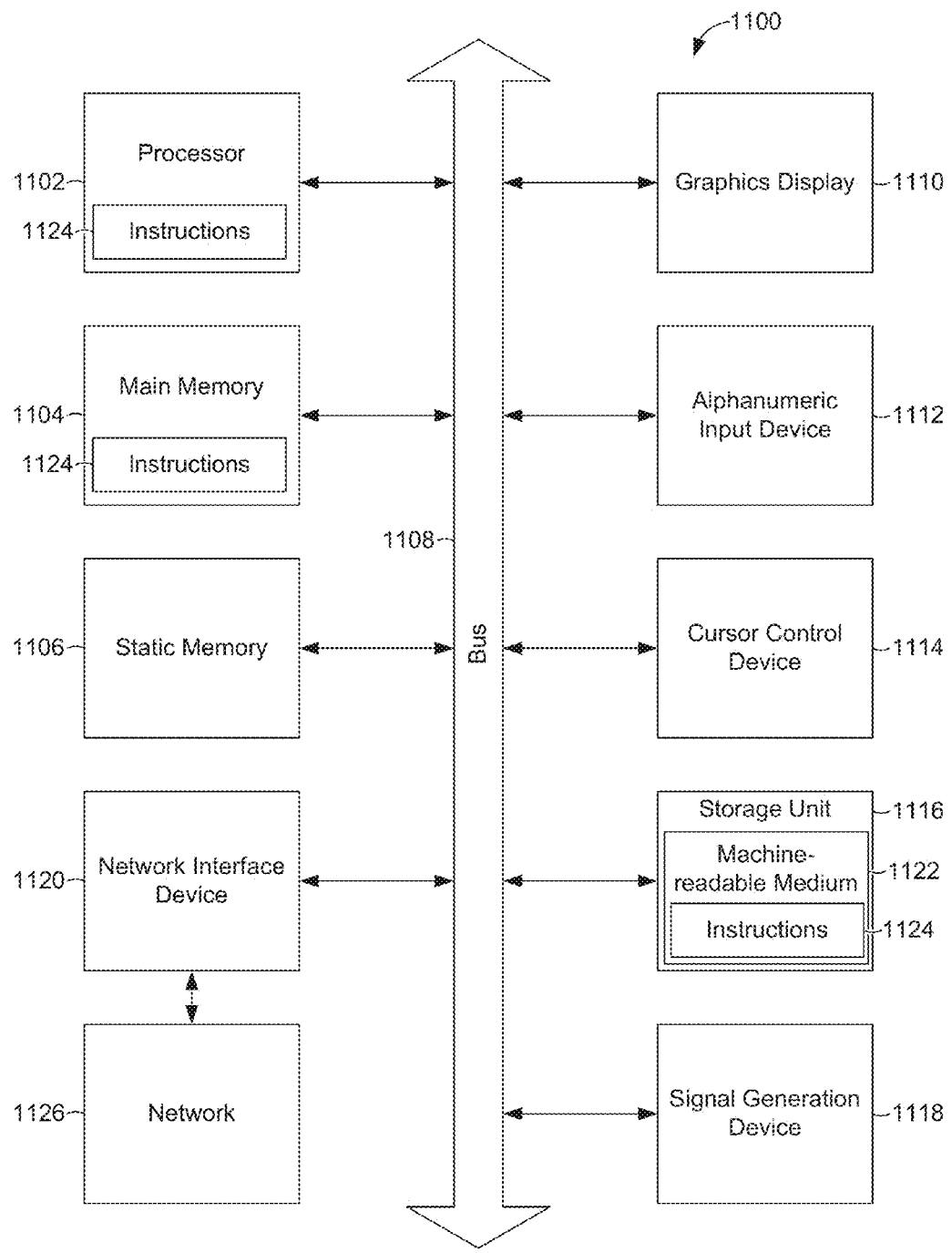
FIG. 11 is a block diagram illustrating components of a machine, according to an example embodiment, able to read instructions from a machine-readable medium and to perform any one or more of the methodologies discussed herein.

FIG. 11 illustrates components of a machine 1100, according to some example embodiments, that is able to read instructions from a machine-readable medium (e.g., machine-readable storage medium) and perform any one or more of the methodologies discussed herein. Specifically, FIG. 11 shows a diagrammatic representation of the machine 1100 in the example form of a computer system and within which instructions 1124 (e.g., software) for causing the machine 1100 to perform any one or more of the methodologies discussed herein may be executed. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), cellular telephone, a smartphone, a web appliance, a network router, a network switch, a network bridge, or any machine capable of executing the instructions 1124 (sequentially or otherwise) that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 (e.g., software) embodying any one or more of the methodologies or functions described herein. The instructions 1124 may also reside, completely or at least partially, within the main memory 1104, within the processor 1102. (e.g., within the processor's cache memory), or both, during execution thereof by machine 1100. Accordingly, the main memory 1104 and the processor 1102 may be considered as machine-readable media. The instructions 1124 may be transmitted or received over a network 1126 (e.g., network 120) via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., software) for execution by the machine, such that the instructions, when executed by one or more processors of the machine (e.g., processor 1102), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
receiving, by at least one processor of a display characteristic determination machine, at least one request from a seller to display first content with second content, wherein the request includes data that relates the first content to the second content and includes a first item for sale by the seller and a second item related to the first item and associated with another seller;
identifying, by the at least one processor of the display characteristic determination machine, a layout position that is offered by a web server of the second content and that is usable to display the first content;
allocating the layout position to the first content, the allocating being performed by the at least one processor of the display characteristic determination machine, the allocating the layout position performed by automatically determining that the first content is to occupy the layout position offered by the web server;
based on the determining that the first content is to occupy the layout position, automatically generating, by the at least one processor of the display characteristic determination machine, at least some of the first content to include a storefront that overlays a portion of the second content without abandoning viewing of the second content, the storefront operable to initiate a purchase of the first item; and
communicating to the web server, by the display characteristic determination machine, that the layout position is allocated to the first content that corresponds to the first item related to the second content.

2. The method of claim 1 further comprising:
generating the at least some of the first content to include an advertisement of the first item.

3. The method of claim 1, wherein:
the layout position visually differentiates the first content from other content displayed with the second content.

4. The method of claim 1 further comprising:
receiving, by the at least one processor of the display characteristic determination machine, a bid from the seller for the layout position;
accessing, by the at least one processor of the display characteristic determination machine, a price of the layout position; and wherein
the determination that the first content is to occupy the layout position includes a comparison of the received bid to the accessed price.

5. The method of claim 1,
further comprising generating at least some of the storefront to include a first representation and a second representation of items, the first representation being of the first item and indicating that the first item is available from the seller, the second representation being of the second item and indicating that the second item is available from the second seller.

6. The method of claim 5, wherein
receiving the at least one request comprises:
receiving a first request that the storefront include the first representation; and
receiving a second request that the storefront include the second representation, the second request referencing the first item and at least one of the second item or the second seller.

7. The method of claim 1 further comprising:
accessing, by the at least one processor of the display characteristic determination machine, a profile that corresponds to the layout position and includes at least one of a web traffic metric, a buyer conversion rate, a topic tag, or a sales commission; and wherein:
the determination that the first content is to occupy the layout position is based on the profile that corresponds to the layout position.

8. The method of claim 1 further comprising:
accessing, by the at least one processor of the display characteristic determination machine, a profile that corresponds to the request and includes at least one of a size, a typeface, the layout position, or a topic tag; and wherein:
the determination that the first content is to occupy the layout position is based on the profile that corresponds to the request.

9. The method of claim 1 further comprising:
accessing, by the at least one processor of the display characteristic determination machine, a profile that corresponds to the request and includes at least one of a product name, a quantity, a unit price, a topic tag, or a maximum sales cost; and wherein:
the determination that the first content is to occupy the layout position is based on the profile that corresponds to the request.

10. The method of claim 1, wherein:
the request includes an identifier of at least one of the web server or the layout position; and
the identifying of the layout position is based on the identifier.

11. A system comprising:
one or more processors;
a non-transitory computer readable medium;
a reception module stored on the non-transitory computer readable medium, the reception module executable to configure at least one of the one or more processors to receive at least one request from a seller to display first content with second content, wherein the request includes data that relates the first content to the second content and includes a first item for sale by the seller and a second item related to the first item and associated with another seller;
an identification module stored on the non-transitory computer readable medium, the identification module executable to configure at least one of the one or more processors to identify a layout position that is offered by a web server of the second content and that is usable to display the first content;
a determination module stored on the non-transitory computer readable medium, the determination module executable to configure at least one of the one or more processors to allocate the layout position to the first content by automatically determining that the first content is to occupy the layout position offered by the web server, and, based on the determining that the first content is to occupy the layout position, automatically generating, by at least one of the one or more processors, at least some of the first content to include a storefront that overlays a portion of the second content without abandoning viewing of the second content, the storefront operable to initiate a purchase of the first item; and
a transmission module stored on the non-transitory computer readable medium, the transmission module executable to configure at least one of the one or more processors to communicate to the web server that the layout position is allocated to the first content that corresponds to the first item related to the second content.

12. The system of claim 11, wherein:
the reception module is further executable to configure at least one of the one or more processors to receive a bid from the seller for the layout position and access a price of the layout position; and
the determination module is further executable to configure at least one of the one or more processors to compare the received bid to the accessed price.

13. The system of claim 11, further comprising
a generation module stored on the non-transitory computer readable medium, the generation module executable to configure at least one of the one or more processors to generate the at least some of the first content to include a first representation and second representation of items, the first representation being of the first item and indicating that the first item is available from the seller, the second representation being of the second item and indicating that the second item is available from the second seller.

14. The system of claim 13, wherein:
the at least one request comprises a first request that the first content include the first representation and a second request that the first content include the second representation, the second request referencing the first item and at least one of the second item or the second seller.

15. The system of claim 11, wherein:
the reception module is further executable to configure at least one of the one or more processors to access a profile that corresponds to the layout position and includes at least one of a web traffic metric, a buyer conversion rate, a topic tag, or a sales commission; and
the determination module is further executable to configure at least one of the one or more processors to determine that the first content is to occupy the layout position based on the profile that corresponds to the layout position.

16. The system of claim 11, wherein:
the reception module is further executable to configure at least one of the one or more processors to access a profile that corresponds to the request and includes at least one of a size, a typeface, the layout position, or a topic tag; and
the determination module is further executable to configure at least one of the one or more processors to determine that the first content is to occupy the layout position based on the profile that corresponds to the request.

17. A non-transitory machine-readable storage medium comprising instructions that, in response to being executed by one or more processors of a system, cause the system to perform operations comprising:
receiving, at a display characteristic determination machine, at least one request from a seller to display first content with second content, wherein the request includes data that relates the first content to the second content and includes a first item for sale by the seller and a second item related to the first item and associated with another seller;
identifying a layout position that is offered by a web server of the second content and that is usable to display the first content;

allocating the layout position to the first content, the allocating being performed by at least one processor of the display characteristic determination machine, the allocating the layout position performed by automatically determining that the first content is to occupy the layout position offered by the web server;

based on the determining that the first content is to occupy the layout position, automatically generating, by at least one processor of the display characteristic determination machine, at least some of the first content to include a storefront that overlays a portion of the second content without abandoning viewing of the second content, the storefront operable to initiate a purchase of the first item; and communicating to the web server, by the display characteristic determination machine, that the layout position is allocated to the first content that corresponds to the first item related to the second content.

18. The non-transitory machine-readable storage medium of claim 17, wherein the operations further comprise:

accessing a profile that corresponds to the request and includes at least one of a product name, a quantity, a unit price, a topic tag, or a maximum sales cost; and wherein:

the determination that the first content is to occupy the layout position is based on the profile of the request.

* * * * *